United States Patent
Lee et al.

(10) Patent No.: US 10,205,164 B2
(45) Date of Patent: Feb. 12, 2019

(54) POROUS SILICON-BASED ANODE ACTIVE MATERIAL, METHOD FOR PREPARING THE SAME, AND LITHIUM SECONDARY BATTERY COMPRISING THE SAME

(71) Applicants: LG Chem, Ltd., Seoul (KR); SJ Materials Co., Ltd., Ulsan (KR)

(72) Inventors: Mi Rim Lee, Daejeon (KR); Jung Woo Yoo, Daejeon (KR); Eun Kyung Kim, Daejeon (KR); Yong Ju Lee, Daejeon (KR); Han Ho Lee, Seoul (KR); Ji Hyun Yoon, Ulsan (KR); Byoung Man Bang, Gyeongsangbuk-do (KR); Chang Rae Lee, Ulsan (KR); Il Kyo Jeong, Ulsan (KR); Mi Kyeong Lee, Gyeongsangbuk-do (KR)

(73) Assignees: LG Chem Ltd. (KR); SJ Materials Co., Ltd. (KR)

( * ) Notice: Subject to any disclaimer, the term of this patent is extended or adjusted under 35 U.S.C. 154(b) by 0 days.

(21) Appl. No.: 14/421,948

(22) PCT Filed: Dec. 2, 2014

(86) PCT No.: PCT/KR2014/011728
§ 371 (c)(1),
(2) Date: Feb. 16, 2015

(87) PCT Pub. No.: WO2015/084036
PCT Pub. Date: Jun. 11, 2015

(65) Prior Publication Data
US 2016/0028084 A1  Jan. 28, 2016

(30) Foreign Application Priority Data
Dec. 3, 2013 (KR) .......... 10-2013-0149404

(51) Int. Cl.
*H01M 4/38* (2006.01)
*H01M 4/583* (2010.01)
(Continued)

(52) U.S. Cl.
CPC .......... *H01M 4/386* (2013.01); *C01B 33/113* (2013.01); *H01M 4/0471* (2013.01);
(Continued)

(58) Field of Classification Search
None
See application file for complete search history.

(56) References Cited

U.S. PATENT DOCUMENTS

2003/0118905 A1   6/2003   Fukuoka et al.
2003/0215711 A1*  11/2003  Aramata ............... B82Y 30/00
                                                   429/218.1
(Continued)

FOREIGN PATENT DOCUMENTS

CN    103107315 A    5/2013
EP    2343758 A1     7/2011
(Continued)

OTHER PUBLICATIONS

International Search Report from PCT/KR2014/011728, dated Mar. 17, 2015.
(Continued)

*Primary Examiner* — Wyatt P McConnell
(74) *Attorney, Agent, or Firm* — Lerner, David, Littenberg, Krumholz & Mentlik, LLP

(57) ABSTRACT

Provided are a porous silicon-based anode active material including porous $SiO_x$ particles ($0 \leq x < 2$) having surfaces coated with an oxide layer, a method of preparing the same, and a lithium secondary battery including the porous silicon-based anode active material. Since the anode active material includes an oxide layer formed on the porous $SiO_x$ particles
(Continued)

($0 \leq x < 2$), a reactivity between the anode active material and an electrolyte solution may be reduced and, as a result, an electrical short circuit in an electrode may be minimized. Also, since a plurality of pores is included in surfaces or the surfaces and inside of the $SiO_x$ particles, a thickness change rate of the electrode generated during charge and discharge of a secondary battery may be reduced and lifetime characteristics may be improved.

21 Claims, 1 Drawing Sheet

(51) Int. Cl.
| | | |
|---|---|---|
| *H01M 4/587* | (2010.01) | |
| *H01M 4/36* | (2006.01) | |
| *H01M 4/485* | (2010.01) | |
| *H01M 10/052* | (2010.01) | |
| *H01M 4/04* | (2006.01) | |
| *C01B 33/113* | (2006.01) | |
| *H01M 4/02* | (2006.01) | |

(52) U.S. Cl.
CPC ......... *H01M 4/0492* (2013.01); *H01M 4/366* (2013.01); *H01M 4/485* (2013.01); *H01M 4/583* (2013.01); *H01M 4/587* (2013.01); *H01M 10/052* (2013.01); *C01P 2004/61* (2013.01); *C01P 2006/40* (2013.01); *H01M 2004/021* (2013.01); *H01M 2004/027* (2013.01); *H01M 2220/30* (2013.01); *Y02T 10/7011* (2013.01)

(56) References Cited

U.S. PATENT DOCUMENTS

| | | | |
|---|---|---|---|
| 2004/0142242 A1* | 7/2004 | Kawase | H01M 4/0404 429/245 |
| 2004/0214085 A1* | 10/2004 | Sheem | H01M 4/134 429/218.1 |
| 2004/0241548 A1 | 12/2004 | Nakamoto et al. | |
| 2005/0031958 A1 | 2/2005 | Fukuoka et al. | |
| 2008/0268652 A1 | 10/2008 | Delahaye et al. | |
| 2008/0305395 A1 | 12/2008 | Hirose et al. | |
| 2009/0092892 A1 | 4/2009 | Yamaguchi et al. | |
| 2009/0226819 A1* | 9/2009 | Ihara | H01M 4/366 429/331 |
| 2009/0226821 A1 | 9/2009 | Ihara et al. | |
| 2011/0086271 A1 | 4/2011 | Lee et al. | |
| 2011/0159368 A1 | 6/2011 | Hirose et al. | |
| 2012/0100438 A1 | 4/2012 | Fasching et al. | |
| 2013/0045420 A1* | 2/2013 | Biswal | C25F 3/12 429/217 |
| 2013/0196158 A1 | 8/2013 | Yoshida et al. | |
| 2013/0280612 A1 | 10/2013 | Lee et al. | |
| 2014/0302396 A1 | 10/2014 | Lu et al. | |

FOREIGN PATENT DOCUMENTS

| | | |
|---|---|---|
| JP | 2004319469 A | 11/2004 |
| JP | 2008004534 A | 1/2008 |
| JP | 4171904 B2 | 10/2008 |
| JP | 2009009727 A | 1/2009 |
| JP | 2012082125 A | 4/2012 |
| KR | 2011-0040478 A | 4/2011 |
| KR | 2012-0051828 A | 5/2012 |
| KR | 2012-0089512 A | 8/2012 |
| KR | 2013-0011154 A | 1/2013 |
| KR | 20130118192 A | 10/2013 |
| TW | 593141 B | 6/2004 |
| TW | 201225389 A | 6/2012 |
| WO | 2012054766 A2 | 4/2012 |
| WO | 2013050785 A1 | 4/2013 |

OTHER PUBLICATIONS

Byoung Man Bang et al: "Scalable approach to multi-dimensional bulk Si anodes via metal-assisted chemical etching", Energy & Environmental Science, Oct. 28, 2011, p. 5013-5019.

* cited by examiner

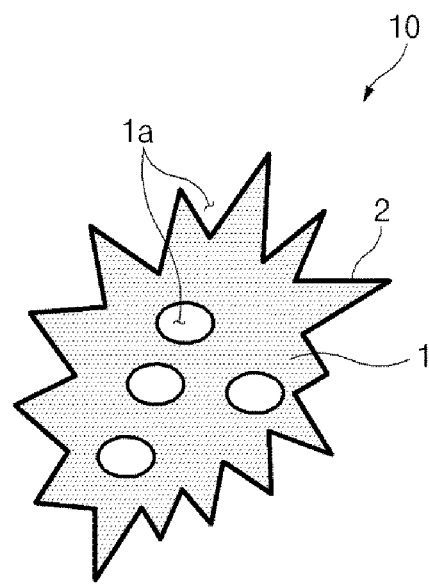

POROUS SILICON-BASED ANODE ACTIVE MATERIAL, METHOD FOR PREPARING THE SAME, AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2014/011728 filed Dec. 2, 2014, which claims priority from Korean Patent Application No. 10-2013-0149404 filed Dec. 3, 2013, all of which are hereby incorporated herein by reference.

TECHNICAL FIELD

The present invention relates to a porous silicon-based anode active material, and more particularly, to a porous silicon-based anode active material including porous $SiO_x$ particles having surfaces coated with an oxide layer, a method for preparing the same, and a lithium secondary battery including the porous silicon-based anode active material.

BACKGROUND ART

Recently, in line with miniaturization, lightweight, thin profile, and portable trends in electronic devices according to the development of information and telecommunications industry, the need for high energy density batteries used as power sources of such electronic devices has increased. Currently, research into lithium secondary batteries, as batteries that may best satisfy the above need, has actively conducted.

Various types of carbon-based materials including artificial graphite, natural graphite, or hard carbon, which are capable of intercalating/deintercalating lithium, have been used as anode active materials of lithium secondary batteries. Among the carbon-based materials, since graphite provides advantages in terms of energy density of a lithium secondary battery and also guarantees long lifespan of the lithium secondary battery due to excellent reversibility, graphite has been most widely used.

However, since graphite may have a low capacity in terms of energy density per unit volume of an electrode and may facilitate side reactions with an organic electrolyte at a high discharge voltage, there is a risk of fire or explosion due to malfunction and overcharge of the battery.

Thus, metal-based anode active materials, such as silicon (Si), have been studied. It is known that a silicon-based anode active material exhibits high capacity. However, the silicon-based anode active material may cause a maximum volume change of 300% or more before and after the reaction with lithium, i.e., during charge and discharge. As a result, conductive networks in the electrode may be damaged and contact resistance between particles may be increased to degrade lifetime characteristics of the battery.

In addition, a thick non-conductive side reaction product layer may be formed on the surface of the silicon-based anode active material during charge and discharge due to the continuous reaction with an electrolyte solution. As a result, the silicon-based anode active material may be electrically short-circuited in the electrode to degrade the lifetime characteristics.

Therefore, there is a need to develop an anode active material which may replace a typical anode active material and may improve the lifetime characteristics and effect of reducing volume expansion of a lithium secondary battery due to less reaction with the electrolyte solution when used in the lithium secondary battery.

DISCLOSURE OF THE INVENTION

Technical Problem

The present invention is provided to solve technical problems of the related art.

The present invention provides a porous silicon-based anode active material which may reduce the occurrence of an electrical short circuit in an electrode and volume expansion rate by reducing a side reaction product layer that is formed on the surfaces of porous silicon-based particles due to the reaction between the particles and an electrolyte solution.

The present invention also provides a method of easily preparing an anode active material which may improve the lifetime characteristics and effect of reducing volume expansion of a lithium secondary battery.

The present invention also provides an anode and a lithium secondary battery including the anode active material.

Technical Solution

According to an aspect of the present invention, there is provided an anode active material including porous $SiO_x$ particles ($0 \leq x < 2$), wherein the porous $SiO_x$ particles include an oxide layer coated on surfaces thereof.

According to another aspect of the present invention, there is provided a method of preparing an anode active material including: preparing porous $SiO_x$ particles ($0 \leq x < 2$) by forming pores on surfaces or the surfaces and inside of $SiO_x$ particles; and heat treating the porous $SiO_x$ particles in air or an oxygen atmosphere to prepare porous $SiO_x$ particles having surfaces coated with an oxide layer.

According to another aspect of the present invention, there is provided an anode including the anode active material.

According to another aspect of the present invention, there is provided a lithium secondary battery including the anode.

Advantageous Effects

Since an anode active material according to an embodiment of the present invention includes porous $SiO_x$ particles ($0 \leq x < 2$) having surfaces coated with an oxide layer, a reactivity between the anode active material and an electrolyte solution may be reduced and, as a result, an electrical short circuit in an electrode may be minimized.

Also, since a plurality of pores is included in surfaces or the surfaces and inside of the $SiO_x$ particles, a thickness change rate of the electrode generated during charge and discharge of a secondary battery may be reduced and lifetime characteristics may be improved.

Furthermore, a method of preparing an anode active material according to an embodiment of the present invention, as a simple method, may easily prepare an anode active material which improves the lifetime characteristics and effect of reducing volume expansion of the secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a cross-sectional structural view schematically illustrating a structure of porous $SiO_x$ particles ($0 \leq x < 2$) having surfaces coated with an oxide layer in an anode active material according to an embodiment of the present invention.

DESCRIPTION OF THE SYMBOLS

1 Porous $SiO_x$ particle ($0 \leq x < 2$)
2 Oxide layer
1a Pores
10 Porous $SiO_x$ particle ($0 \leq x < 2$) having surface coated with oxide layer

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An anode active material according to an embodiment of the present invention includes porous $SiO_x$ particles ($0 \leq x < 2$), wherein the porous $SiO_x$ particles include an oxide layer coated on surfaces thereof.

With respect to a silicon-based anode active material, a thick non-conductive side reaction product layer may be formed on the surface of the silicon-based anode active material during charge and discharge due to the continuous reaction with an electrolyte solution. As a result, the anode active material may be electrically short-circuited in an electrode to degrade lifetime characteristics and the volume expansion of the electrode may be further increased due to the side reaction product layer. In the present invention, a reactivity between the anode active material and the electrolyte solution is reduced by forming an oxide layer on porous $SiO_x$ particles ($0 \leq x < 2$), i.e., silicon-based particles, and thus, the formation of the side reaction product layer, which may be formed on the surface of the anode active material, may be minimized. Also, since a plurality of pores is included in surfaces or the surfaces and inside of the $SiO_x$ particles, a thickness change rate of the electrode generated during charge and discharge of a secondary battery may be reduced and lifetime characteristics may be further improved.

FIG. 1 is a cross-sectional structural view schematically illustrating a structure of porous $SiO_x$ particles ($0 \leq x < 2$) having surfaces coated with an oxide layer (hereinafter simply referred to as "porous silicon-based anode active material") in an anode active material according to an embodiment of the present invention. FIG. 1 is only an example for describing the present invention, and the present invention is not limited thereto. Hereinafter, the present invention will be described with reference to FIG. 1.

In the anode active material according to the embodiment of the present invention, porous silicon-based anode active material 10 includes porous $SiO_x$ particles ($0 \leq x < 2$) 1 and an oxide layer 2 formed on the porous $SiO_x$ particles, and the porous $SiO_x$ particles 1 include a plurality of pores 1a in the surfaces and inside thereof.

Also, in the porous silicon-based anode active material 10, the oxide layer 2 may specifically include a silicon oxide. Furthermore, the silicon oxide may specifically include $SiO_y$ ($0 < y \leq 2$) and in this case, the silicon oxide may be included to satisfy an amount (x) of oxygen and a condition of $x < y$ in a silicon oxide ($SiO_x$, $0 \leq x < 2$) included in the porous $SiO_x$ particles 1. Since an amount (y) of oxygen in $SiO_y$ included in the oxide layer 2 that is formed on the surface is greater than the amount (x) of oxygen in the porous $SiO_x$ particles 1, the reactivity between the anode active material and the electrolyte solution may be reduced.

Specifically, with respect to silicon-based particles, most of the reaction between the silicon-based particles and the electrolyte solution occurs at the surfaces of the silicon-based particles, and the reactivity with the electrolyte solution may be reduced as the amount of oxygen (O) included in the silicon-based particles increases. Thus, in the present invention, the reactivity with the electrolyte solution may be reduced by forming the oxide layer 2 including a silicon oxide of $SiO_y$ ($0 < y \leq 2$ and $x < y$), in which the amount of oxygen is greater than the amount of oxygen in the porous $SiO_x$ particles 1, on the porous $SiO_x$ particles ($0 \leq x < 2$) 1. In the porous silicon-based anode active material 10, x and y may satisfy $x < y$, $0 \leq x < 1$, and $1 < y \leq 2$, may specifically satisfy $0 \leq x \leq 0.5$ and $1.2 \leq y \leq 2$, and more specifically, may satisfy $x = 0$ (porous Si particles) and $y = 2$ ($SiO_2$). In the present invention, the amount of oxygen, for example, may be analyzed by secondary ion mass spectroscopy (SIMS) or high-frequency inductively coupled plasma (ICP).

Also, in the porous silicon-based anode active material 10, a thickness of the oxide layer 2 may be greater than 0 and equal to or less than 200 nm, specifically, greater than 0 and equal to or less than 100 nm, and more specifically, the thin oxide layer 2 may be formed along the outline (surfaces) of the porous $SiO_x$ particles 1. In the case that the thickness of the oxide layer 2 is greater than 200 nm, charge and discharge capacity for the same weight may be reduced while the amount of silicon (Si) is reduced due to the thick oxide layer. In the present invention, the thickness of the oxide layer 2 may be analyzed by a transmission electron microscope (TEM) or X-ray photoelectron spectroscopy (XPS).

In the porous silicon-based anode active material 10, an average particle diameter ($D_{50}$) of the porous $SiO_x$ particles 1 is in a range of 1 μm to 20 μm, specifically may be in a range of 3 μm to 12 μm, and more specifically, may be in a range of 5 μm to 10 μm. In the case that the average particle diameter of the porous $SiO_x$ particles 1 is less than 1 μm, dispersion may be difficult when an anode slurry is prepared by using the porous $SiO_x$ particles 1. In the case in which the average particle diameter of the porous $SiO_x$ particles 1 is greater than 20 μm, since the expansion of the particles due to the charge of lithium ions may become severe, adhesion between particles and adhesion between particles and current collector may decrease as the charge and discharge are repeated. Thus, the lifetime characteristics may be significantly reduced. In the present invention, the average particle diameter of the particles may be defined as a particle diameter at 50% in a cumulative particle diameter distribution. For example, the average particle diameter ($D_{50}$) of the particles may be measured by using a laser diffraction method. The laser diffraction method may generally measure a particle diameter ranging from a submicron level to a few mm, and may obtain highly repeatable and high resolution results.

According to an embodiment of the present invention, in order to achieve desirable performance of an anode, an average diameter of pores of the porous $SiO_x$ particles 1 is in a range of 30 nm to 500 nm as measured on the surface thereof. In the case that the average diameter of the pores is less than 30 nm, an effect of suppressing the volume expansion of the anode active material during charge and discharge may be insignificant. In the case in which the average diameter of the pores is greater than 500 nm, since mechanical strength may decrease due to the large amount of pores present in the anode active material, the anode active material may be fractured during battery manufacturing processes such as mixing of slurry and rolling after coating. In the present invention, the average diameter of the pores, for example, may be measured using scanning electron microscope (SEM) images.

A specific surface area (BET-SSA) of the porous $SiO_x$ particles 1 may be in a range of 5 m²/g to 50 m²/g. In the case that the specific surface area of the porous $SiO_x$ particles 1 is less than 5 m²/g, since pores may not be sufficiently formed, the effect of improving the contact with carbon particles may be insignificant. In the case in which the specific surface area is greater than 50 m²/g, side reactions with an electrolyte solution may be difficult to be reduced due to the large specific surface area. In the present invention, the specific surface area of the porous $SiO_x$ particles 1 may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

According to an embodiment of the present invention, provided is a method of preparing an anode active material including the steps of: preparing porous $SiO_x$ particles ($0 \leq x < 2$) by forming pores on surfaces or the surfaces and inside of $SiO_x$ particles (step 1); and heat treating the porous $SiO_x$ particles in air or an oxygen atmosphere to prepare porous $SiO_x$ particles having surfaces coated with an oxide layer (step 2).

Since an oxide layer may be easily formed on porous $SiO_x$ particles ($0 \leq x < 2$) by a simple method, the preparation method according to the embodiment of the present invention may prepare an anode active material which improves the lifetime characteristics and effect of reducing volume expansion of the battery.

Hereinafter, each step will be described in detail.

In the method of preparing an anode active material according to the embodiment of the present invention, step 1 is a step of preparing porous $SiO_x$ particles ($0 \leq x < 2$) by forming pores on surfaces or the surfaces and inside of $SiO_x$ particles ($0 \leq x < 2$).

In step 1, Si particles may be used alone as the $SiO_x$ particles ($0 \leq x < 2$) (when x=0), or the $SiO_x$ particles ($0 \leq x < 2$) may be prepared or commercial $SiO_x$ particles may be purchased and used.

A method of preparing the $SiO_x$ particles ($0 \leq x < 2$) is not particularly limited so long as an amount of x satisfies the above range, and for example, the $SiO_x$ particles ($0 \leq x < 2$) may be obtained by mechanical alloying after mixing Si particles and $SiO_2$ particles (when $0 < x < 2$). Herein, the expression "mechanical alloying" is referred to as making a mixed composite having a uniform composition by applying a mechanical force. A mechanical alloying method is not particularly limited, but the mechanical alloying, for example, may be performed by using a mechano-fusion apparatus that is known in the art. For example, the mechano-fusion apparatus may include a high-energy ball mill, a planetary mill, a stirred ball mill, or a vibrating mill. Among the above apparatuses, the mechanical alloying may be performed with the high-energy ball mill, but the present invention is not limited thereto. When x satisfies $0 < x < 2$ in the $SiO_x$ particles prepared by the above method, the amount of x may vary depending on the mixed amount of Si and $SiO_2$. Specifically, the range of x may be $0 \leq x < 1$, more specifically, $0 \leq x \leq 0.5$.

Also, in the method of preparing an anode active material according to the embodiment of the present invention, step 1 may include the steps of: mixing a fluorinated solution with a metal precursor solution and then introducing $SiO_x$ particles ($0 \leq x < 2$) into the mixed solution to electrodeposit metal particles on surfaces of the $SiO_x$ particles (step i); etching by contacting the $SiO_x$ particles having metal particles electrodeposited thereon with an etching solution (step ii); and removing the metal particles by contacting the etched $SiO_x$ particles with a metal removal solution (step iii).

Specifically, step i) may be a step of electrodepositing metal particles on the surfaces of $SiO_x$ particles ($0 \leq x < 2$) by introducing the $SiO_x$ particles into the mixed solution, after mixing a fluorinated solution and a metal precursor solution. In this case, the $SiO_x$ particles emit electrons due to the fluorinated solution, and metal ions in the solution receive electrons to be reduced and electrodeposited on the surfaces of the $SiO_x$ particles. Once the metal particles are electrodeposited on the surfaces of the $SiO_x$ particles, continuous electrodeposition may occur as the metal particle itself becomes a catalyst site.

The fluorinated solution used may include at least one selected from the group consisting of hydrogen fluoride (HF), fluorosilicic acid, and ammonium fluoride ($NH_4F$), and the metal precursor solution may include at least one selected from the group consisting of silver (Ag), gold (Au), platinum (Pt), and copper (Cu).

Also, the fluorinated solution and the metal precursor solution may be mixed in a weight ratio of 10:90 to 90:10. In the case that the fluorinated solution is mixed in a weight ratio of less than 10, since an amount of the metal particles electrodeposited on the surfaces of the $SiO_x$ particles may be small and the reaction rate may be very low, a preparation time may increase. In the case in which the fluorinated solution is mixed in a weight ratio of greater than 90, since the rate of electrodeposition of metal particles on the surfaces of the $SiO_x$ particles may be very high, uniform and small-sized metal particles may not be electrodeposited on the $SiO_x$ particles.

Furthermore, the amount of the metal particles electrodeposited on the $SiO_x$ particles may be controlled according to a concentration of the fluorinated solution and a contact time of the $SiO_x$ particles with the metal precursor solution. The $SiO_x$ particles may be added in an amount of 0.001 parts by weight to 50 parts by weight based on 100 parts by weight of the mixed solution of the fluorinated solution and the metal precursor solution.

In the step of preparing $SiO_x$ particles ($0 \leq x < 2$), step ii) may be a step of etching the $SiO_x$ particles by contacting the $SiO_x$ particles having metal particles electrodeposited thereon with an etching solution. That is, step ii) may be a step of forming pores on the surfaces or the surfaces and inside of the $SiO_x$ particles by etching the $SiO_x$ particles by contacting the $SiO_x$ particles having metal particles electrodeposited thereon with an etching solution. Nanopores, mesopores, and macropores may be formed through the etching process.

The etching of the $SiO_x$ particles is performed as follows. For example, metal particles become metal ions by being oxidized by $H_2O_2$, the $SiO_x$ particles are continuously dissolved while transferring electrons to the metal particles at interfaces between the $SiO_x$ particles and the metal particles, and the reduction of the oxidized metal ions occurs at the metal particles electrodeposited on the surfaces of the above-described $SiO_x$ particles. Accordingly, the $SiO_x$ particles in contact with the metal particles may be continuously etched to form a honeycomb-shaped porous structure at least on the surfaces thereof, and a pore size may be controlled according to the resultant product finally etched by controlling the type of metal particles and reaction time.

A mixed solution of a hydrogen fluoride (HF) solution and a hydrogen peroxide ($H_2O_2$) solution may be used as the etching solution, and an amount of the HF solution included may vary depending on the degree of etching. However, the HF solution and the $H_2O_2$ solution may be mixed in a weight ratio of 10:90 to 90:10. In this case, the amount of $H_2O_2$ plays an important role in the formation of pores in the $SiO_x$ particles.

Also, the etching may be performed for 30 minutes to 24 hours according to the concentration of the etching solution. In the case that the etching is performed less than 30 minutes, the formation of pores may be insignificant. In the case in which the etching is performed greater than 24 hours, the $SiO_x$ particles are excessively etched, and thus, mechanical properties of the active material may be deteriorated.

In the step of preparing $SiO_x$ particles ($0 \leq x < 2$), step iii) may be a step of removing the metal particles by contacting the etched $SiO_x$ particles with a metal removal solution. The metal removal solution used may include at least one selected from the group consisting of nitric acid ($HNO_3$), sulfuric acid ($H_2SO_4$), and hydrochloric acid (HCl). The etching method may form pores without changing the crystal structure of the $SiO_x$ particles. Porous $SiO_x$ particles ($0 \leq x < 2$), in which a plurality of pores is formed on the surfaces or the surfaces and inside of the particles, may be obtained by the above-described preparing process.

Next, in the method of preparing an anode active material according to the embodiment of the present invention, step 2 is a step of heat treating the porous $SiO_x$ particles ($0 \leq x < 2$) prepared in step 1 in air or an oxygen atmosphere to form an oxide layer on the porous $SiO_x$ particles.

In step 2, the heat treatment may be performed in a temperature range of 600° C. to 900° C. for 1 minute to 12 hours. In the case that the heat treatment temperature is less than 600° C., the formation of the oxide layer on the porous $SiO_x$ particles may be difficult due to the excessively low temperature. In the case in which the heat treatment temperature is greater than 900° C., a thick oxide layer may be formed within a short period of time due to high reactivity, and thus, the thickness control of the oxide layer may be difficult.

Also, according to an embodiment of the present invention, the thickness of the oxide layer may be controlled by the heat treatment temperature and heat treatment time. For example, the thickness of the oxide layer may be increased as the heat treatment temperature is high or the heat treatment time is long. According to an embodiment of the present invention, the heat treatment time is in a range of 1 minute to 12 hours, specifically may be in a range of 30 minutes to 10 hours, and more specifically, may be in a range of 1 hour to 8 hours. In the case that the heat treatment time is less than 1 minute, since the reaction time is short, the formation of the oxide layer on the porous $SiO_x$ particles ($0 \leq x < 2$) may be difficult. In the case in which the heat treatment time is greater than 12 hours, since the thickness of the oxide layer is increased, capacity of the secondary battery may be reduced and lifetime characteristics of the silicon-based anode active material may degrade due to the thick oxide layer when used in the secondary battery.

Porous $SiO_x$ particles ($0 \leq x < 2$) having surfaces coated with an oxide layer, i.e., a porous silicon-based anode active material, may be prepared by the above-described preparation process.

In addition, the preparation method according to the embodiment of the present invention may further include mixing the porous silicon-based anode active material prepared in the above step and a carbon-based anode active material.

The carbon-based anode active material may be mixed in an amount of 0 parts by weight to 99 parts by weight, specifically, 50 parts by weight to 98 parts by weight, based on 100 parts by weight of the porous silicon-based anode active material. In the case that the amount of the carbon-based anode active material used is greater than 99 parts by weight, since the amount of the porous silicon-based anode active material is relatively decreased, high capacity may be difficult to be achieved.

The carbon-based anode active material may include natural graphite, artificial graphite, meso-carbon microbeads (MCMB), amorphous hard carbon, or low crystalline soft carbon, and any one thereof or a mixture of two or more thereof may be used.

Also, the carbon-based anode active material has an average particle diameter ($D_{50}$) of a few micrometers (μm). Specifically, the average particle diameter ($D_{50}$) of the carbon-based anode active material usable in the present invention may be in a range of 2 μm to 20 μm. The average particle diameter of the carbon-based anode active material may be measured in the same manner used for measuring the average particle diameter of the porous $SiO_x$ particles.

According to another embodiment of the present invention, an anode including the anode active material is provided.

Furthermore, according to another embodiment of the present invention, provided is a lithium secondary battery including a cathode, the anode, a separator disposed between the cathode and the anode, and an electrolyte in which a lithium salt is dissolved.

The anode active material thus prepared may be used to prepare an anode by a typical method in the art. For example, the anode active material according to the embodiment of the present invention is mixed with a binder, a solvent, and a conductive material if necessary, and stirred to prepare a slurry. Then, a current collector may be coated with the slurry and pressed to prepare an anode.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers thereof, may be used as the binder. N-methyl pyrrolidone, acetone, or water may be used as the solvent.

Any conductive material may be used without particular limitation so long as it has suitable conductivity without causing adverse chemical changes in the batteries. For example, the conductive material may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; fluorocarbon powder; metal powder such as aluminum powder, and nickel powder; conductive whiskers such as zinc oxide whiskers and potassium titanate whiskers; conductive metal oxide such as titanium oxide; or polyphenylene derivatives. The conductive material may have an average particle diameter ($D_{50}$) of a few hundred nanometers. Specifically, the average particle diameter ($D_{50}$) of the conductive material may be in a range of 20 nm to 1 μm. The average particle diameter of the conductive material may be measured in the same manner used for measuring the average particle diameter of the porous $SiO_x$ particles.

Similar to the preparation of the anode, a cathode active material, a conductive material, a binder, and a solvent are mixed to prepare a slurry, and a cathode may then be prepared by directly coating a metal current collector with the slurry or by casting the slurry on a separate support and laminating an active material film for cathode separated from the support on a metal current collector.

Examples of the cathode active material may be a layered compound, such as lithium cobalt oxide ($LiCoO_2$), lithium nickel oxide ($LiNiO_2$), $Li[Ni_xCo_yMn_zM_v]O_2$ (where M is any one selected from the group consisting of aluminum (Al), gallium (Ga), and indium (In), or two or more elements thereof; and $0.3 \leq x<0.1$, $0 \leq y$, $z \leq 0.5$, $0 \leq v \leq 0.1$, and $x+y+z+v=1$), $Li(Li_aM_{b-a-b'}M'_{b'})O_{2-c}A_c$ (where $0 \leq a \leq 0.2$, $0.6 \leq b \leq 1$, $0 \leq b' \leq 0.2$, and $0 \leq c \leq 0.2$; M includes manganese (Mn) and at least one selected from the group consisting of nickel (Ni), cobalt (Co), iron (Fe), chromium (Cr), vanadium (V), Cu, zinc (Zn), and titanium (Ti); M' is at least one selected from the group consisting of Al, magnesium (Mg), and boron (B); and A is at least one selected from the group consisting of phosphorous (P), fluorine (F), sulfur (S), and nitrogen (N)), or a compound substituted with at least one transition metal; lithium manganese oxides such as the chemical formula $Li_{1+y}Mn_{2-y}O_4$ (where $0 \leq y \leq 0.33$), $LiMnO_3$, $LiMn_2O_3$, and $LiMnO_2$; lithium copper oxide ($Li_2CuO_2$); vanadium oxides such as $LiV_3O_8$, $LiFe_2O_4$, $V_2O_5$, and $Cu_2V_2O_7$; Ni-site type lithium nickel oxide represented by the chemical formula $LiNi_{1-y}M_yO_2$ (where M is Co, Mn, Al, Cu, Fe, Mg, B, or Ga, and $0.01 \leq y \leq 0.3$); lithium manganese complex oxide represented by the chemical formula $LiMn_{2-y}M_yO_2$ (where M is Co, Ni, Fe, Cr, Zn, or tantalum (Ta), and $0.01 \leq y \leq 0.1$) or $Li_2Mn_3MO_8$ (where M is Fe, Co, Ni, Cu, or Zn); $LiMn_2O_4$ having a part of Li being substituted with alkaline earth metal ions; a disulfide compound; and $Fe_2(MoO_4)_3$. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers, and a polymer separator base material having at least one surface thereof coated with ceramic may be used. However, the present invention is not limited thereto.

In an electrolyte solution used in an embodiment of the present invention, a lithium salt, which may be included as the electrolyte, may be used without limitation so long as it is typically used in an electrolyte solution for a secondary battery. For example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in an embodiment of the present invention, an organic solvent included in the electrolyte solution may be used without limitation so long as it is typically used in the art. Typically, any one selected from the group consisting of propylene carbonate, ethylene carbonate, diethyl carbonate, dimethyl carbonate, ethylmethyl carbonate, methylpropyl carbonate, dipropyl carbonate, fluoro-ethylene carbonate, dimethyl sulfoxide, acetonitrile, dimethoxyethane, diethoxyethane, vinylene carbonate, sulfolane, γ-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate, and ethyl butylate, or a mixture of two or more thereof may be used.

In particular, among the carbonate-based organic solvents, ring-type carbonates such as ethylene carbonate and propylene carbonate, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, a mixture of the ring-type carbonate and the linear carbonate, for example, may be used.

Selectively, the electrolyte stored according to the present invention may further include an additive, such as an overcharge inhibitor, that is included in a typical electrolyte.

The lithium secondary battery may be prepared in such a manner that a separator is disposed between the cathode and the anode to form an electrode assembly, the electrode assembly is put in a cylindrical battery case or prismatic battery case or aluminum pouch, and the electrolyte is injected thereinto, or the electrode assembly is stacked and impregnated with the electrolyte solution, and the product thus obtained is put in a battery case and sealed.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

The Embodiment For Carrying Out The Invention

Hereinafter, the present invention will be described in detail, according to specific examples. The invention may, however, be embodied in many different forms and should not be construed as being limited to the example embodiments set forth herein. Rather, these example embodiments are provided so that this description will be thorough and complete, and will fully convey the scope of the present invention to those skilled in the art.

EXAMPLES

<Preparation of Anode Active Material>

Preparation Example 1

<Step of Preparing Porous $SiO_x$ Particles (x=0)>

Step i) Electrodepositing Ag on Surfaces of Si Particles

A 300 ml solution containing 10% hydrogen fluoride (HF) and a 300 ml solution containing 10 mM silver nitrate ($AgNO_3$) were mixed for 10 minutes to prepare a mixture solution. 2 g of Si was added to the mixture solution, in which the hydrogen fluoride and the silver nitrate were mixed, and mixed for 5 minutes. Then, Si electrodeposited with Ag was prepared by filtering, washing, and drying the mixture.

Step ii) Etching

A 200 ml solution containing 5% hydrogen fluoride and a 100 ml solution containing 1.5 wt % hydrogen peroxide ($H_2O_2$) were mixed for 10 minutes to prepare an etching solution. Si electrodeposited with Ag was introduced into the etching solution, in which the hydrogen fluoride and the hydrogen peroxide were mixed, and mixed for 30 minutes. Then, porous $SiO_x$ (x=0) (hereinafter simply referred to as "porous Si") was prepared by filtering, washing, and drying the mixture.

Step iii) Removing Ag 100 ml of 60% nitric acid ($HNO_3$) was heated to 50° C., and the porous Si was then added thereto and mixed for 2 hours to prepare porous Si having Ag removed therefrom by filtering, washing, and drying the mixture. In this case, an average particle diameter ($D_{50}$) of the porous Si was 5 μm and a specific surface area (BET-SSA) was 18 $m^2$/g.

<Step of Forming Oxide Layer on the Porous $SiO_x$ Particles (x=0)>

The porous Si particles prepared in step iii) and having an average particle diameter ($D_{50}$) of 5 μm and a specific surface area (BET-SSA) of 18 $m^2$/g were heat treated at about 800° C. for 2 hours in air to prepare porous Si particles including an oxide layer of 20 nm thick $SiO_y$ (y=2) on the surface of the porous Si.

In this case, the amount of oxygen, for example, may be analyzed by secondary ion mass spectroscopy (SIMS) or high-frequency inductively coupled plasma (ICP). Also, the thickness of the oxide layer may be analyzed by a transmission electron microscope (TEM) or X-ray photoelectron spectroscopy (XPS).

Preparation Example 2

Porous Si particles including an oxide layer were prepared in the same manner as in Preparation Example 1 except that Si particles including an oxide layer of 40 nm thick $SiO_y$ (y=2) on the surface of the porous Si were obtained by heat treating porous Si particles at about 900° C. for 2 hours in air in the <Step of Forming Oxide Layer> of Preparation Example 1.

Preparation Example 3

Graphite and the porous Si particles including an oxide layer prepared in Preparation Example 1 were mixed at a weight ratio of 95:5 to be used as an anode active material.

Preparation Example 4

Graphite and the porous Si particles including an oxide layer prepared in Preparation Example 2 were mixed at a weight ratio of 95:5 to be used as an anode active material.

Comparative Example 1-1

The porous Si particles having an average particle diameter ($D_{50}$) of 5 μm and a specific surface area (BET-SSA) of 18 $m^2$/g, which were prepared in step iii) of Preparation Example 1, were used as an anode active material.

Comparative Example 1-2

The porous Si particles having an average particle diameter ($D_{50}$) of 5 μm and a specific surface area (BET-SSA) of 18 $m^2$/g, which were prepared in step iii) of Preparation Example 1, were surface coated with carbon in an amount of 5 wt % based on a total weight of the anode active material by chemical vapor deposition and then used as an anode active material.

Comparative Example 1-3

Graphite and the porous Si particles having an average particle diameter ($D_{50}$) of 5 μm and a specific surface area (BET-SSA) of 18 $m^2$/g, which were prepared in step iii) of Preparation Example 1, were mixed at a weight ratio of 95:5 to be used as an anode active material.

Comparative Example 1-4

Non-porous Si particles and graphite were mixed at a weight ratio of 5:95 to be used as an anode active material.

Comparative Example 1-5

Si particles including an oxide layer of 20 nm thick $SiO_y$ (y=2) on the surface of Si were obtained by heat treating non-porous Si particles at about 800° C. for 2 hours in air. Graphite and the Si particles including an oxide layer were mixed at a weight ratio of 95:5 to be used as an anode active material.

Comparative Example 1-6

Graphite and the porous silicon particles having a carbon coating layer prepared in Comparative Example 1-2 were mixed at a weight ratio of 95:5 to be used as an anode active material.

<Preparation 1 of Coin-type Half Cell>

Example 1-1

The anode active material prepared in Preparation Example 1, an acetylene black conductive material, and a polyvinylidene fluoride binder were mixed at a weight ratio of 80:10:10 in an N-methyl-2-pyrrolidone solvent to prepare a slurry. One surface of a copper current collector was coated with the prepared slurry to a thickness of 30 μm, dried and rolled. Then, an anode was prepared by punching into a predetermined size.

A non-aqueous electrolyte solution was prepared by adding 10 wt % of fluoroethylene carbonate based on a total amount of the electrolyte solution to a mixed solvent including 1.0 M $LiPF_6$ and an organic solvent which was prepared by mixing ethylene carbonate and diethyl carbonate at a weight ratio of 30:70.

A lithium foil was used as a counter electrode, a polyolefin separator was disposed between both electrodes, and a coin-type half cell was then prepared by injecting the electrolyte solution.

Example 1-2

A coin-type half cell was prepared in the same manner as in Example 1-1 except that the anode active material prepared in Preparation Example 2 was used as an anode active material instead of using the anode active material prepared in Preparation Example 1.

Comparative Example 2-1

A coin-type half cell was prepared in the same manner as in Example 1-1 except that the anode active material prepared in Comparative Example 1-1 was used as an anode active material instead of using the anode active material prepared in Preparation Example 1.

Comparative Example 2-2

A coin-type half cell was prepared in the same manner as in Example 1-1 except that the anode active material prepared in Comparative Example 1-2 was used as an anode active material instead of using the anode active material prepared in Preparation Example 1.

Experimental Example 1

Capacity Characteristics, Lifetime Characteristics, and Thickness Expansion Rate Analysis Capacity characteristics and lifetime characteristics of the coin-type half cells prepared in Examples 1-1 and 1-2 and Comparative Examples 2-1 and 2-2 according to charge and discharge cycles were evaluated.

Specifically, the coin-type half cells prepared in Examples 1-1 and 1-2 and Comparative Examples 2-1 and 2-2 were charged at 0.1 C to a voltage of 0.005 V and a current of 0.005 C under constant current/constant voltage (CC/CV) conditions at 23° C., and then discharged at 0.1 C to a voltage of 1.5 V under a constant current (CC) condition to measure capacities. Thereafter, the coin-type half cells were charged at 0.5 C to a voltage of 5 mV and a current of 0.005 C under constant current/constant voltage (CC/CV) conditions, and then discharged at 0.5 C to a voltage of 1.0 V under a constant current (CC) condition. This charge and discharge cycle was repeated 1 to 50 times. The results thereof are presented in Table 1 below.

Also, each coin-type half cell was disassembled in a charge state of a 50th cycle and a thickness of an electrode was measured. Then, a thickness change rate was obtained by comparing the above thickness with a thickness of the electrode before the first cycle. The results thereof are presented in Table 1 below.

TABLE 1

| Examples | Capacity (mAh/g) | Lifetime characteristics (%) | Thickness expansion rate (%) |
| --- | --- | --- | --- |
| Example 1-1 | 2795 | 75.6 | 155 |
| Example 1-2 | 2550 | 78.5 | 140 |
| Comparative Example 2-1 | 3059 | 50.4 | 170 |

TABLE 1-continued

| Examples | Capacity (mAh/g) | Lifetime characteristics (%) | Thickness expansion rate (%) |
| --- | --- | --- | --- |
| Comparative Example 2-2 | 2863 | 62.6 | 160 |

Lifetime characteristics=(discharge capacity in a 50th cycle/discharge capacity in the first cycle)×100

Thickness expansion rate=[(electrode thickness in a charge state of a 50th cycle−electrode thickness before a first cycle)/electrode thickness before the first cycle]× 100

As illustrated in Table 1, the cells including a porous silicon-based anode active material, in which an oxide layer of $SiO_y$ (y=2) was formed on the surfaces of porous Si particles, as in Examples 1-1 and 1-2 had a slightly decreasing effect on the capacity characteristics, but had a significantly increasing effect on the lifetime characteristics and thickness expansion rate in comparison to Comparative Example 2-1 including porous silicon particles, on which an oxide layer was not formed, as an anode active material and Comparative Example 2-2 including porous silicon particles having a carbon coating layer on the surfaces thereof as an anode active material.

Specifically, the lifetime characteristics of the cells of Examples 1-1 and 1-2 including a porous silicon-based anode active material, in which an oxide layer of $SiO_y$ (y=2) was formed on the surfaces of porous Si particles, were increased by 50% or more in comparison to that of Comparative Example 2-1 including porous silicon particles, on which an oxide layer was not formed, as an anode active material. Also, the electrode thickness expansion rates of Examples 1-1 and 1-2 were decreased by 10% or more in comparison to that of Comparative Example 2-1. The above result was due to the fact that, in the case that an oxide layer was formed on the surfaces of porous Si particles as in Examples 1-1 and 1-2, the lifetime characteristics were improved and the electrode thickness expansion rate was decreased due to a reduction in side reactions with the electrolyte solution.

Also, the lifetime characteristics of the cells of Examples 1-1 and 1-2 were increased by about 20% or more in comparison to that of Comparative Example 2-2 including porous silicon particles having a carbon coating layer on the surfaces thereof as an anode active material, and the electrode thickness expansion rates of Examples 1-1 and 1-2 were decreased by about 3% or more in comparison to that of Comparative Example 2-2. From these results, it may be understood that the case of forming an oxide layer on the surface of porous Si had better effects of improving the lifetime characteristics and decreasing the electrode thickness expansion rate due to the reduction in side reactions with the electrolyte solution than the case of forming a carbon coating layer as in Comparative Examples 2-2.

<Preparation 2 of Coin-Type Half Cell>

Example 2-1

The anode active material prepared in Preparation Example 3, an acetylene black conductive material, a carboxymethyl cellulose thickener, and a styrene-butadiene rubber binder were mixed at a weight ratio of 97:1:1:1 in an N-methyl-2-pyrrolidone solvent to prepare slurry. One surface of a copper current collector was coated with the prepared slurry to a thickness of 50 μm, dried and rolled. Then, an anode was prepared by punching into a predetermined size.

A non-aqueous electrolyte solution was prepared by adding 10 wt % of fluoroethylene carbonate based on a total amount of the electrolyte solution to a mixed solvent including 1.0 M $LiPF_6$ and an organic solvent which was prepared by mixing ethylene carbonate and diethyl carbonate at a weight ratio of 30:70.

A lithium foil was used as a counter electrode, a polyolefin separator was disposed between both electrodes, and a coin-type half cell was then prepared by injecting the electrolyte solution.

Example 2-2

A coin-type half cell was prepared in the same manner as in Example 2-1 except that the anode active material prepared in Preparation Example 4 was used as an anode active material instead of using the anode active material prepared in Preparation Example 3.

Comparative Example 2-3

A coin-type half cell was prepared in the same manner as in Example 2-1 except that the anode active material prepared in Comparative Example 1-3 was used as an anode active material instead of using the anode active material prepared in Preparation Example 3.

Comparative Example 2-4

A coin-type half cell was prepared in the same manner as in Example 2-1 except that the anode active material prepared in Comparative Example 1-4 was used as an anode active material instead of using the anode active material prepared in Preparation Example 3.

Comparative Example 2-5

A coin-type half cell was prepared in the same manner as in Example 2-1 except that the anode active material prepared in Comparative Example 1-5 was used as an anode active material instead of using the anode active material prepared in Preparation Example 3.

Comparative Example 2-6

A coin-type half cell was prepared in the same manner as in Example 2-1 except that the anode active material prepared in Comparative Example 1-6 was used as an anode active material instead of using the anode active material prepared in Preparation Example 3.

Experimental Example 2

Capacity Characteristics, Lifetime Characteristics, and Thickness Expansion Rate Analysis Capacity characteristics and lifetime characteristics of the coin-type half cells prepared in Examples 2-1 and 2-2 and Comparative Examples 2-3 to 2-6 according to charge and discharge cycles were evaluated in the same manner as in Experimental Example 1.

The results thereof are presented in Table 2 below.

TABLE 2

| Examples | Capacity (mAh/g) | Lifetime characteristics (%) | Thickness expansion rate (%) |
|---|---|---|---|
| Example 2-1 | 484.8 | 83.5 | 93.9 |
| Example 2-2 | 483.2 | 82.2 | 92.1 |
| Comparative Example 2-3 | 485.7 | 77.4 | 103.5 |
| Comparative Example 2-4 | 480.5 | 70.1 | 140.5 |
| Comparative Example 2-5 | 484.8 | 78.1 | 97.6 |
| Comparative Example 2-6 | 478.5 | 80.1 | 101.5 |

As confirmed in Table 2, Examples 2-1 and 2-2 including a porous silicon-based anode active material, in which an oxide layer of $SiO_y$ (y=2) was formed on the surfaces of porous Si particles, with a carbon-based anode active material had a significantly improving effect on the lifetime characteristics and electrode thickness expansion rate in comparison to Comparative Examples 2-3 to 2-6 as well as excellent capacity characteristics the same as or better than those of Comparative Examples 2-3 to 2-6. With respect to Examples 2-1 and 2-2, capacity tended to decrease in comparison to Comparative Example 2-3, but the decreased value was within the range of error and was in a range that did not affect the capacity characteristics when used in the secondary battery.

Specifically, under the condition of including a carbon-based anode active material by mixing, the thickness expansion rate of the anode including porous Si particles having an oxide layer of $SiO_y$ (y=2) on the surfaces thereof as in Examples 2-1 and 2-2 was decreased by about 7% to about 10% in comparison to that of Comparative Example 2-3 which included the anode including porous Si particles on which an oxide layer was not formed, and was decreased by about 30% in comparison to that of Comparative Example 2-4 which included the anode including non-porous Si particles on which an oxide layer was not formed.

Also, with respect to the lifetime characteristics, the lifetime characteristics of Examples 2-1 and 2-2 including an oxide layer were improved by about 7% to about 11% in comparison to that of Comparative Example 2-3 which included the anode including porous Si particles on which an oxide layer was not formed, and were improved by about 17% to about 19% in comparison to that of Comparative Example 2-4 which included the anode including non-porous Si particles on which an oxide layer was not formed.

Thus, it may be understood that since the side reactions with the electrolyte were reduced by forming an oxide layer on porous Si particles as in Examples 2-1 and 2-2, the lifetime characteristics were improved and the electrode expansion rate was decreased.

Also, under the same condition of including a carbon-based anode active material by mixing, in the case of including a porous silicon-based anode active material including an oxide layer of $SiO_y$ (y=2) on the surfaces of porous Si particles as in Examples 2-1 and 2-2, the lifetime characteristics was increased by about 7% and the electrode thickness expansion rate was decreased by about 4% or more in comparison to Comparative Example 2-5 including an anode active material in which an oxide layer was formed on non-porous Si particles. Also, the larger the thickness of the oxide layer was, the greater the effect of improving the lifetime characteristics and reducing the thickness expansion rate was. From these results, it may be understood that the lifetime characteristics and thickness expansion rate may vary depending on the presence of porosity of Si particles coated even if an oxide layer was formed on the surfaces of the Si particles, and the effect of improving the lifetime characteristics and reducing the thickness expansion rate may be further increased when the coated Si particles was porous.

Furthermore, under the same condition of including a carbon-based anode active material by mixing, in the case of including a porous silicon-based anode active material including an oxide layer of $SiO_y$ (y=2) on the surfaces of porous Si particles as in Examples 2-1 and 2-2, the lifetime characteristics was increased by about 2% or more and the electrode thickness expansion rate was decreased by about 3% or more in comparison to Comparative Example 2-6 including an anode active material in which a carbon coating layer was formed on porous Si particles. From these results, it may be understood that, as a coating layer on the porous Si particles, the oxide layer had better effects of improving the lifetime characteristics and decreasing the electrode thickness expansion rate than the carbon coating layer.

Thus, from the results of Table 2, it may be confirmed that, with respect to Examples 2-1 and 2-2, the lifetime characteristics and electrode thickness expansion rate were significantly improved while maintaining the capacity characteristics.

INDUSTRIAL APPLICABILITY

Since an anode active material according to an embodiment of the present invention includes porous $SiO_x$ particles ($0 \leq x < 2$) having surfaces coated with an oxide layer, a reactivity between the anode active material and an electrolyte solution may be reduced and, as a result, an electrical short circuit in an electrode may be minimized. Also, since a plurality of pores is included in surfaces or the surfaces and inside of the $SiO_x$ particles, a thickness change rate of the electrode generated during charge and discharge of a secondary battery may be reduced and lifetime characteristics may be improved. Accordingly, the anode active material may be used in an anode for a lithium secondary battery and a lithium secondary battery including the anode, and the lithium secondary battery may not only be used in a battery cell that is used as a power source of a small device, but may also be used as a unit cell in a medium and large sized battery module including a plurality of battery cells.

The invention claimed is:

1. An anode, comprising:
an anode active material; and
a binder,
wherein the anode active material comprises:
porous $SiO_x$ particles ($0 \leq x < 2$), wherein the porous $SiO_x$ particles comprise an oxide layer coated on surfaces thereof; and
carbon-based anode active material particles,
wherein the oxide layer comprises $SiO_y$ ($0 < y \leq 2$), and $x < y$,
wherein the porous $SiO_x$ particles include pores on surfaces and inside of $SiO_x$ particles, and
wherein the oxide layer is formed by heat treating the porous $SiO_x$ particles in air or an oxygen atmosphere.

2. The anode of claim 1, wherein x and y respectively satisfy $0 \leq x < 1$ and $1 < y \leq 2$.

3. The anode of claim 2, wherein x and y respectively satisfy $0 \leq x < 0.5$ and $1.2 \leq y \leq 2$.

4. The anode of claim 1, wherein a thickness of the oxide layer is greater than 0 and equal to or less than 200 nm.

5. The anode of claim 4, wherein the thickness of the oxide layer is greater than 0 and equal to or less than 100 nm.

6. The anode of claim 1, wherein an average particle diameter ($D_{50}$) of the porous $SiO_x$ particles is in a range of 1 μm to 20 μm.

7. The anode of claim 1, wherein an average pore diameter of the porous $SiO_x$ particles is in a range of 30 nm to 500 nm as measured on the surface thereof.

8. The anode of claim 1, wherein a specific surface area of the porous $SiO_x$ particles is in a range of 5 $m^2/g$ to 50 $m^2/g$.

9. The anode of claim 1, wherein the porous $SiO_x$ particles are porous silicon (Si) particles.

10. The anode of claim 1, wherein the carbon-based anode active material particles comprises any one selected from the group consisting of natural graphite, artificial graphite, meso-carbon microbeads, amorphous hard carbon, and low crystalline soft carbon, or a mixture of two or more thereof.

11. A method of preparing the anode active material of claim 1, the method comprising:
preparing porous $SiO_x$ particles ($0 \leq x < 2$) by forming pores on the surfaces and inside of $SiO_x$ particles;
heat treating the porous $SiO_x$ particles in air or an oxygen atmosphere to prepare porous $SiO_x$ particles having surfaces coated with an oxide layer; and
mixing the heated treated porous $SiO_x$ particles with the carbon-based anode active material particles to form the anode active material.

12. The method of claim 11, wherein the forming of the pores comprises:
mixing a fluorinated solution with a metal precursor solution and introducing $SiO_x$ particles ($0 \leq x < 2$) into the mixed solution to electrodeposit metal particles on surfaces of the $SiO_x$ particles;
etching by contacting the $SiO_x$ particles having metal particles electrodeposited thereon with an etching solution; and
removing the metal particles by contacting the etched $SiO_x$ particles with a metal removal solution.

13. The method of claim 11, wherein the $SiO_x$ particles ($0 \leq x \leq 2$) comprise Si particles or one prepared by mechanical alloying after mixing Si particles and $SiO_2$ particles.

14. The method of claim 11, wherein the oxide layer comprises $SiO_y$ ($0 < y \leq 2$), and $x < y$.

15. The method of claim 11, wherein the heat treatment is performed in a temperature range of 600° C. to 900° C. for 1 minute to 12 hours.

16. The method of claim 11, wherein a thickness of the oxide layer is greater than 0 and equal to or less than 200 nm.

17. The method of claim 11, wherein the carbon-based anode active material comprises any one selected from the group consisting of natural graphite, artificial graphite, meso-carbon microbeads, amorphous hard carbon, and low crystalline soft carbon, or a mixture of two or more thereof.

18. A lithium secondary battery comprising the anode of claim 1.

19. The anode of claim 1, further comprising:
a conductive material.

20. The anode of claim 1, wherein an average particle diameter ($D_{50}$) of the carbon-based anode active material particles is in a range of 2 μm to 20 μm.

21. An anode comprising:
an anode active material; and
a binder,
wherein the anode active material comprises:
porous $SiO_x$ particles ($0 \leq x < 2$) comprising an oxide layer coated on surfaces thereof; and
carbon-based anode active material particles,
wherein the oxide layer comprises $SiO_y$ ($0 < y \leq 2$), and $x < y$,
wherein the porous $SiO_x$ particles include pores on surfaces and inside of $SiO_x$ particles,
wherein the anode active material is prepared by a method comprising:
heat treating the porous $SiO_x$ particles in air or an oxygen atmosphere to form the oxide layer; and
mixing the heated treated porous $SiO_x$ particles with the carbon-based anode active material particles to form the anode active material.

\* \* \* \* \*